(12) United States Patent
Fukawatase et al.

(10) Patent No.: US 7,628,422 B2
(45) Date of Patent: Dec. 8, 2009

(54) AIRBAG DEVICE

(75) Inventors: Osamu Fukawatase, Aichi-ken (JP); Shuji Yamada, Aichi-ken (JP); Yasushi Itou, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/390,571

(22) Filed: Feb. 23, 2009

(65) Prior Publication Data
US 2009/0218795 A1     Sep. 3, 2009

(30) Foreign Application Priority Data
Feb. 22, 2008   (JP)   ............... 2008-041832

(51) Int. Cl.
*B60R 21/16*   (2006.01)
(52) U.S. Cl. .................... 280/739; 280/743.2
(58) Field of Classification Search ............... 280/739, 280/743.1, 743.2, 740
See application file for complete search history.

(56) References Cited

U.S. PATENT DOCUMENTS

| | | | | |
|---|---|---|---|---|
| 5,280,953 A | * | 1/1994 | Wolanin et al. | 280/739 |
| 6,095,557 A | * | 8/2000 | Takimoto et al. | 280/739 |
| 6,126,196 A | * | 10/2000 | Zimmerman | 280/739 |
| 6,863,304 B2 | * | 3/2005 | Reiter et al. | 280/739 |
| 7,328,915 B2 | * | 2/2008 | Smith et al. | 280/739 |
| 7,347,450 B2 | * | 3/2008 | Williams et al. | 280/739 |
| 7,568,729 B2 | * | 8/2009 | Schnieder et al. | 280/739 |
| 2003/0209895 A1 | * | 11/2003 | Gu | 280/739 |
| 2004/0056459 A1 | * | 3/2004 | Kassman et al. | 280/739 |
| 2004/0090054 A1 | * | 5/2004 | Bossecker et al. | 280/739 |
| 2004/0130135 A1 | | 7/2004 | Ekdahl | |

FOREIGN PATENT DOCUMENTS

JP     2004155420     6/2004

* cited by examiner

*Primary Examiner*—Faye M. Fleming
(74) *Attorney, Agent, or Firm*—Gifford, Krass, Sprinkle, Anderson & Citkowski, P.C.

(57) ABSTRACT

An airbag device includes a bag element. The bag element includes a bag body that has a hole portion; and a tube vent that is formed in a cylindrical shape with both ends open. The tube vent has a proximal end connected to the bag body along the hole portion and is rolled up from a distal end of the tube vent toward a proximal end of the tube vent. The tube vent is unrolled as the bag body is inflated and deployed, and discharges gas from the bag body when the distal end extends outside the bag body.

16 Claims, 10 Drawing Sheets

AIRBAG DEVICE

INCORPORATION BY REFERENCE

The disclosure of Japanese Patent Application No. 2008-041832 filed on Feb. 22, 2008 including the specification, drawings and abstract is incorporated herein by reference in its entirety.

BACKGROUND OF THE INVENTION

1. Field of the Invention

The invention relates to an airbag device that is mounted on a vehicle and that deploys a bag element in front of an occupant when the vehicle collides with an object.

2. Description of the Related Art

Japanese Patent Application Publication No. 2004-155420 (JP-A-2004-155420) describes an airbag device. The airbag device includes a bag element (airbag) that is provided with a cylindrical tube. The distal end of the tube is located inside the bag element. In addition, the distal end of the tube is retained by a clamp, or the like, to maintain the tube located inside the bag element even when the bag element is inflated and deployed. When the tube is retained inside the deployed bag element, the tube is flattened by gas pressure inside the bag element to retain a flat shape.

When the tube is released from the clamp once the bag element has deployed, the gas pressure inside the bag element inflate the tube and causes it to extend outside of the bag element. Thus, the gas inside the bag element is discharged from the proximal end of the tube through the distal end of the tube to the outside of the bag element. Thereby adjusting the gas pressure inside the bag element.

With the configuration described in JP-A-2004-155420, the distal end of the tube is flattened with gas pressure in the deployed bag element when retained inside the bag element; however, gas inside the bag element leaks through the tube during the initial stages of deploying the bag element (that is, from when the bag element initiates inflation until the bag element is deployed), so it is necessary to increase the size of a gas generator, such as an inflator, that feeds gas into the bag element in order to quickly inflate and deploy the bag element.

SUMMARY OF THE INVENTION

The invention provides an airbag device that suppresses gas leakage through a tube vent before the tube vent extends to the outside of a bag element and that efficiently and quickly deploys the bag element.

An airbag device according to an embodiment of the invention includes a bag element. The bag element includes a bag body that becomes inflated when gas is supplied to the inside of the bag body, which also increases the internal pressure in the bag body, and that includes a hole portion through which gas is discharged to the outside of the bag body; and a tube vent that is formed in a cylindrical shape, wherein the tube vent has a proximal end portion connected to the bag body along the hole portion and is rolled up from a distal end of the tube vent toward a proximal end of the tube vent, wherein, when the tube vent is rolled out as the bag body inflates and deploys, the tube vent is able to discharge the gas inside the bag body to the outside of the bag body when the distal end extends to the outside of the bag body.

In the airbag device according to the above embodiment, when gas is supplied to the inside of the bag body that constitutes the bag element to increase the internal pressure in the bag body, the bag body inflates. As the bag body is deployed, the tube, is unrolled. In this way, when the tube vent is extended to the outside of the bag body after the tube vent is completely rolled out, the inside and outside of the bag body are in fluid communication with each other through the tube vent. Then, gas inside the bag body is discharged to the outside of the bag body through the tube vent. Thus, the internal pressure in the bag body is adjusted.

Here, according to the above airbag device, before the bag body inflates and deploys, the tube vent is rolled up from the distal end toward the proximal end. When the tube vent is thus rolled up, the proximal end of the tube vent is compressed by the rolled-up distal end or the rolled-up distal end is crammed inside the proximal end. Thus, the proximal end of the tube vent is closed or the opening area is considerably small if not completely closed.

Therefore, when the bag body deploys, gas leakage from the tube vent and the hole portion is effectively suppressed until the tube vent is completely unrolled. Thus, the inflation and deployment of the bag body may be improved, and, even when the performance of a gas generator, such as an inflator, that supplies gas into the bag body is not unnecessarily improved, it is possible to efficiently inflate and deploy the bag body.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
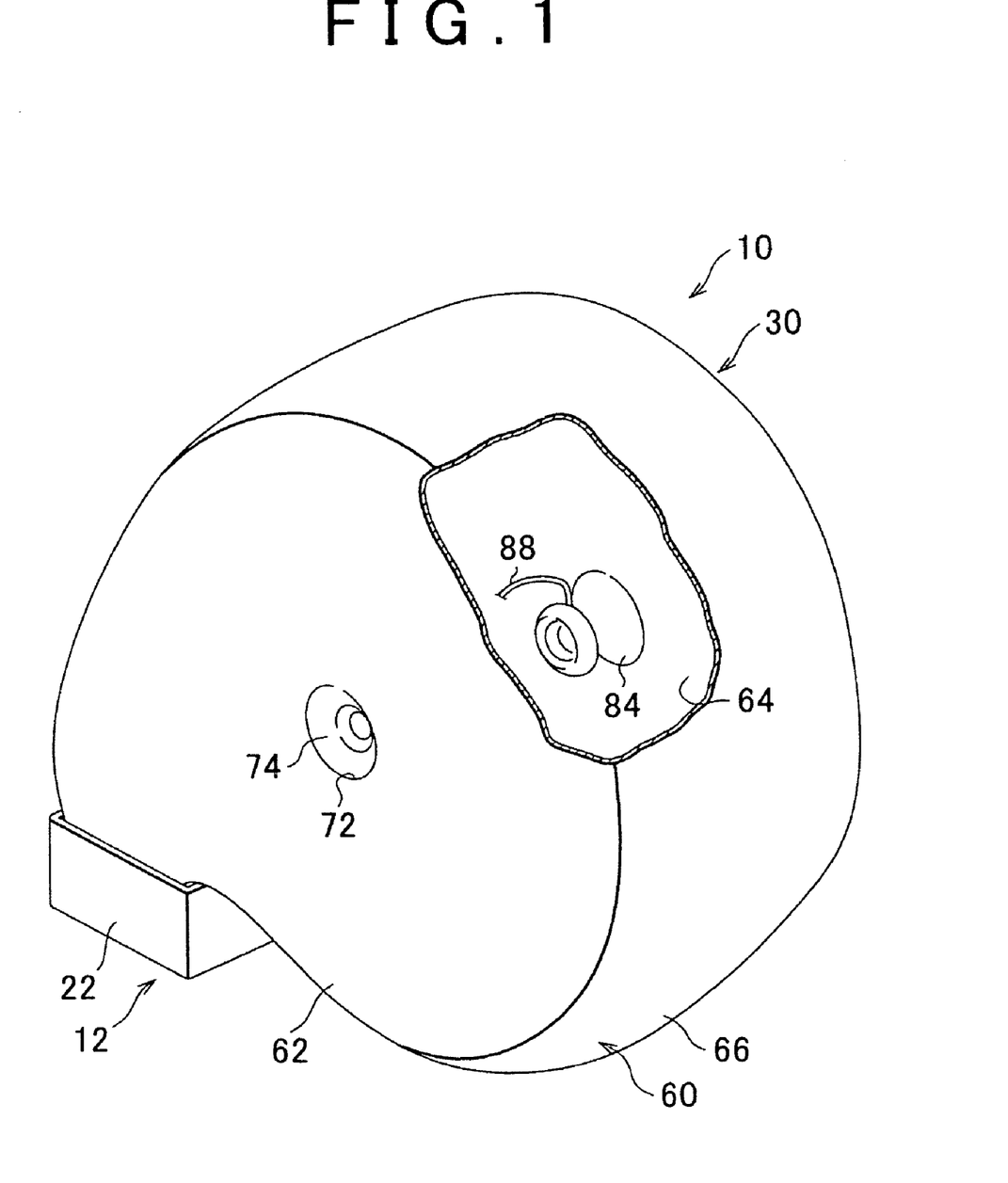
FIG. 1 is a perspective view of an airbag device according to an embodiment of the invention.
Figure 9:
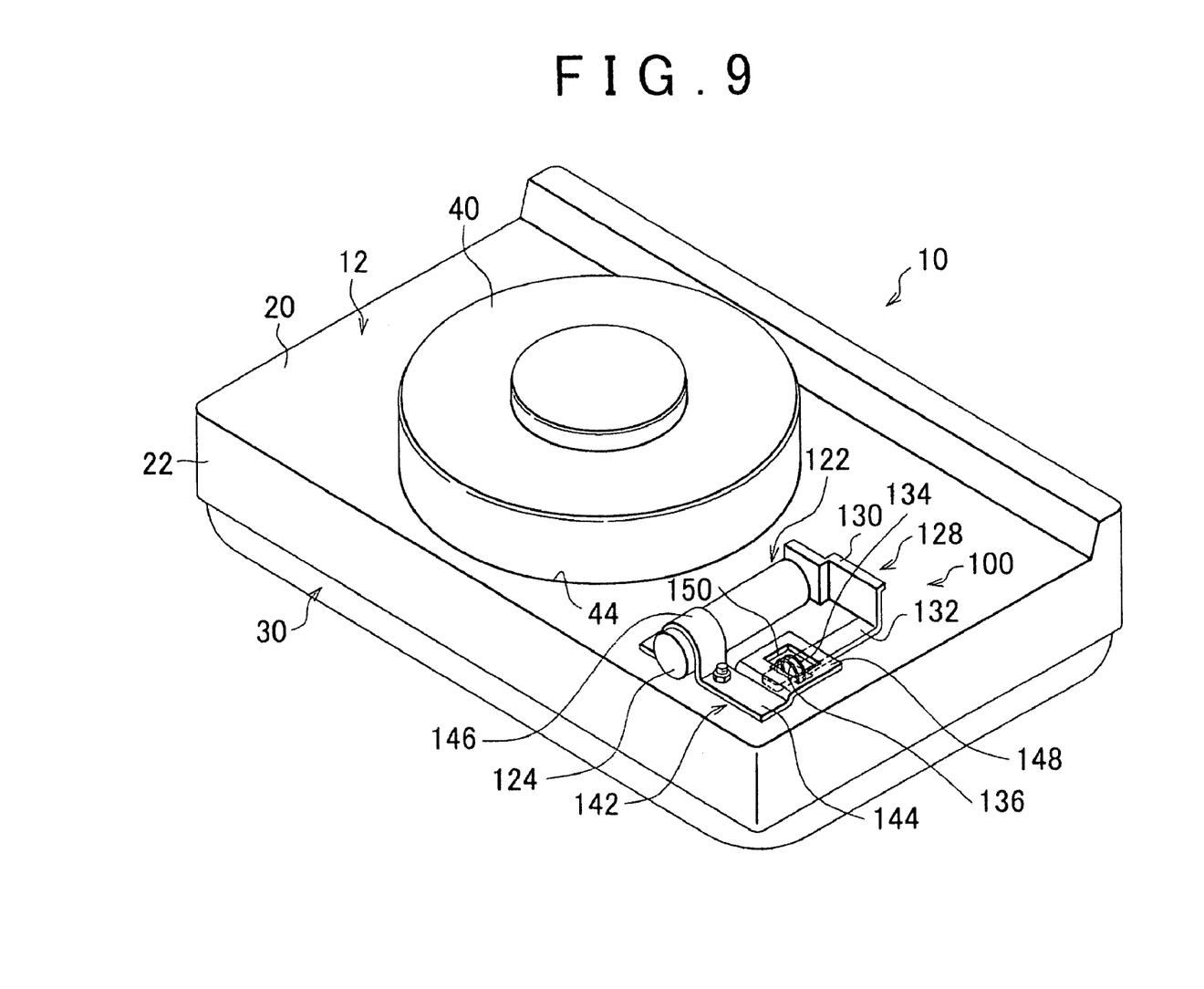
FIG. 9 is a perspective view of the airbag device according to the embodiment of the invention when the bag element is rolled up as viewed from the rear side.

FIG. 1 shows a perspective view of a relevant portion of an airbag device 10 according to one embodiment of the invention. FIG. 9 shows a perspective view of the airbag device 10 as viewed from the rear side. Note that in FIG. 1, a bag element 30, which will be described later, is deployed, and in FIG. 9, the bag element 30 is rolled up.

As shown in these drawings, the airbag device 10 includes a base plate 12. As shown in FIG. 9, when the airbag device 10 is intended for the front passenger seat of a vehicle 14, the airbag device 10 is fixed to a vehicle structural member, such as a reinforcement, on the rear side of an instrument panel 16 of the vehicle 14. In addition, although not specifically shown in the drawing in detail, when the airbag device 10 is intended for the driver seat of the vehicle 14, the base plate 12 may be arranged inside a rim that constitutes the steering wheel and is fixed to a spoke, or the like, of the steering wheel.

The base plate 12 has a substantially rectangular bottom wall 20 in plan view and a peripheral wall 22 that extends upward (downward in FIG. 9) from the outer peripheral portion of the bottom wall 20. In addition, the rolled bag element 30 is provided on the base plate 12. The open end of the bag element 30 is fixed to the bottom wall 20 inside the peripheral wall 22 with a bracket, or the like. In addition, an inflator 40 is provided on the base plate 12. The body portion of the inflator 40 has a substantially disk shape or a substantially cylindrical shape having a relatively short axial length.

Figure 2:
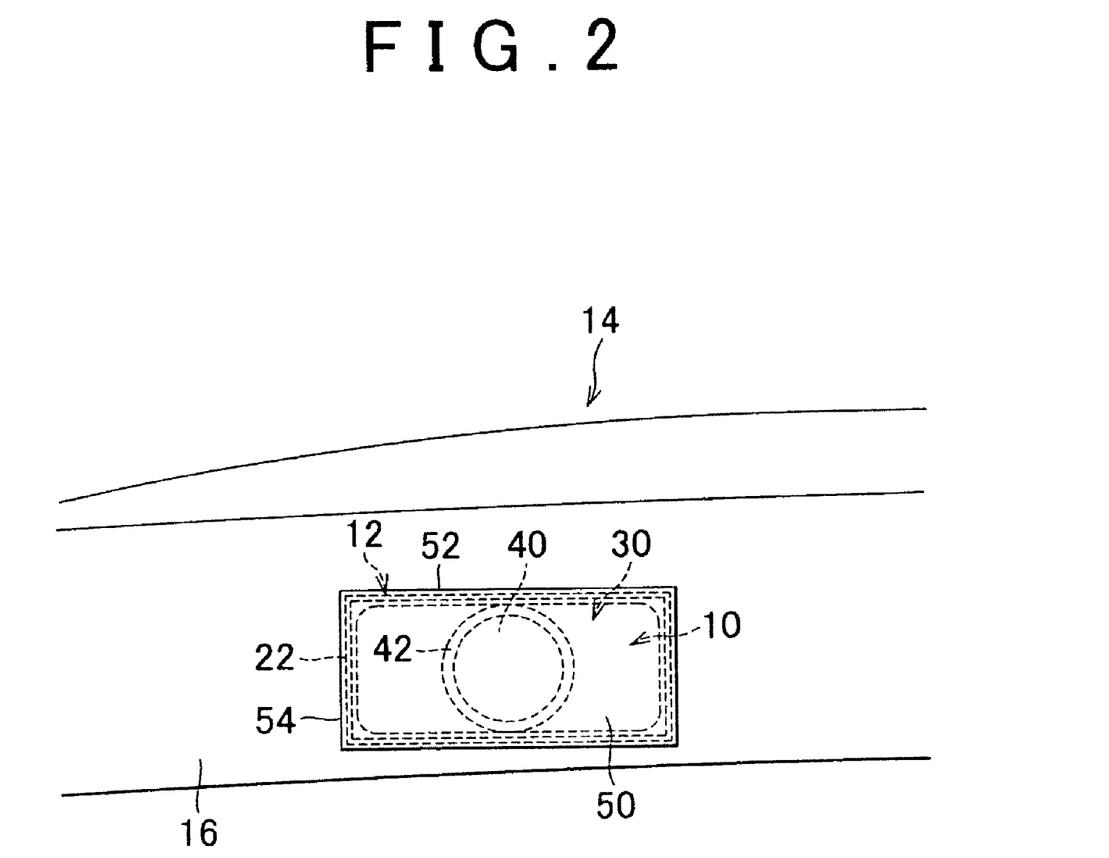
FIG. 2 is a plan view of a portion at which the airbag device according to the embodiment of the invention is installed inside a vehicle compartment when the airbag device is not activated.
Figure 3:
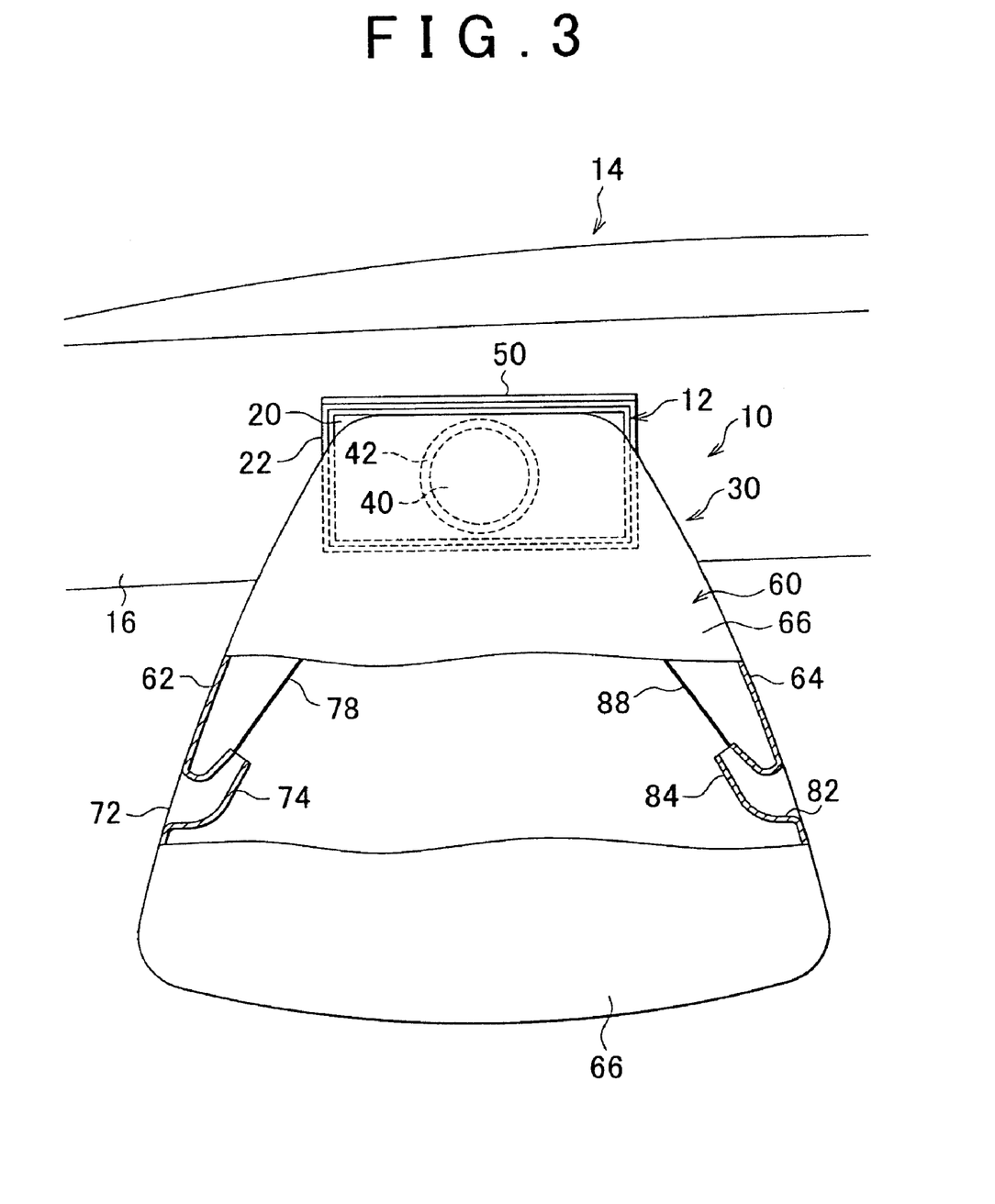
FIG. 3 is a plan view that shows the bag element during the initial stage of deployment, when the distal ends of tube vents are retained within the bag element.
Figure 4:
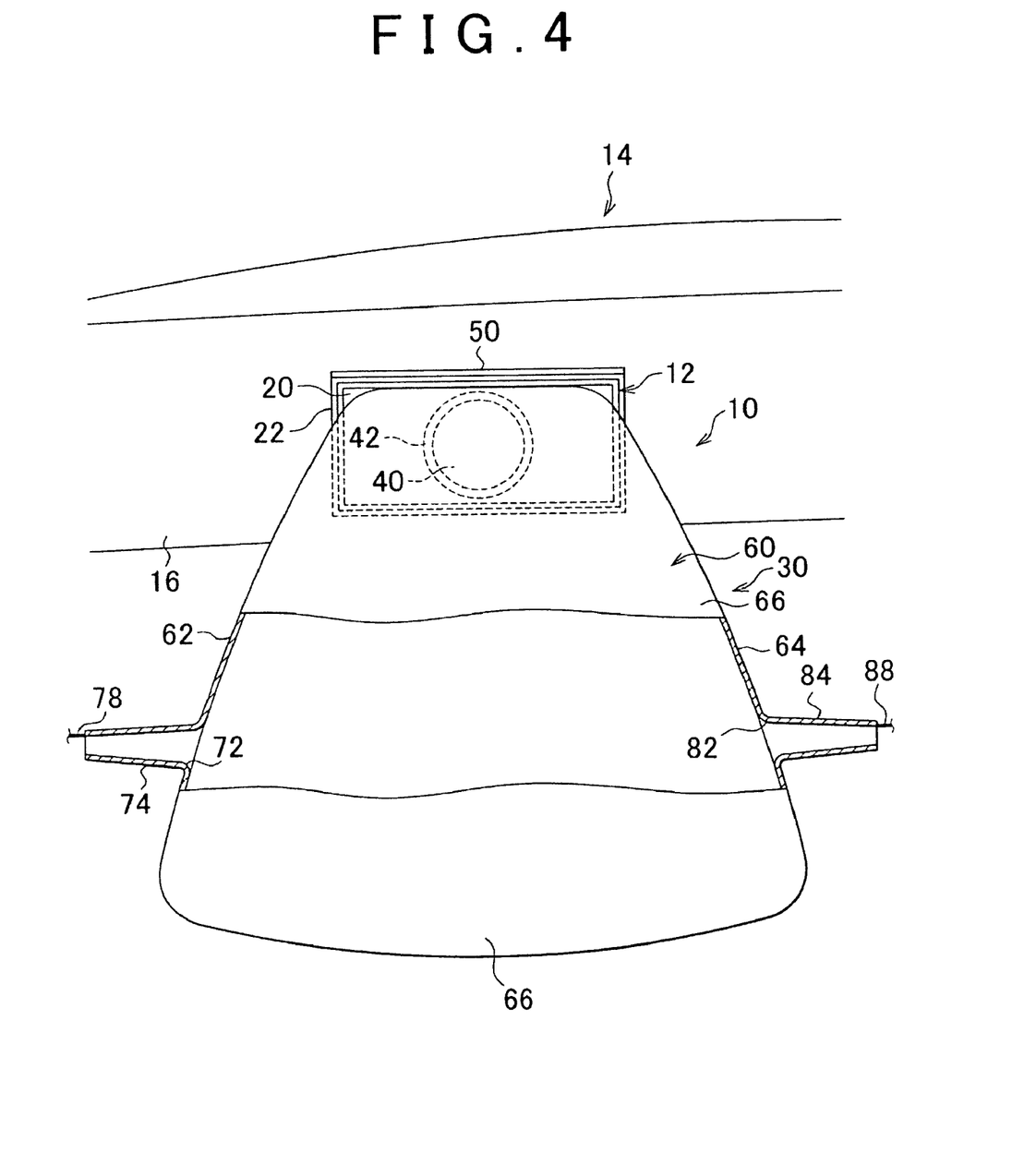
FIG. 4 is a plan view that shows a state where the distal ends of the tube vents are released and then the tube vents extend to the outside of the bag element.

A flange portion 42 shown in FIG. 2 to FIG. 4 (not shown in FIG. 9) is formed at the axially middle portion of the body portion of the inflator 40. In addition, the lower side (upper side in FIG. 9) of the body portion of the inflator 40 with respect to the flange portion 42 extends through a circular hole 44 formed in the bottom wall 20. The inflator 40 partially extends through the circular hole 44 and contacts the upper surface of the bottom wall 20 at the flange portion 40 thereof. In addition, the inflator 40 is fixed to the bottom wall 20 so that a gap between the circular hole 44 and the inflator 40 is sealed.

The flange portion 42 of the inflator 40 is fitted to the base plate 12. The inflator 40 is located inside the open end of the rolled bag element 30. The inflator 40 generates gas instantaneously after it is activated, and expels the gas along the upper side with respect to the bottom wall 20. In this way, the pressure of the discharged gas from the inflator 40 inflates the bag element 30.

As shown in FIG. 2, an airbag door 50 is formed in the instrument panel 16 of the vehicle 14 to cover the airbag device 10. The outer peripheral shape of the airbag door 50 is substantially rectangular and is larger than the outer peripheral shape of the peripheral wall 22 (that is, the base plate 12). A hinge portion 52 is formed at the front boundary between the airbag door 50 and an other portion of the instrument panel 16. The portion of the instrument panel 16 formed as the hinge portion 52 is thinner than the non-hinge portion of the instrument panel 16. For this reason, the hinge portion 52 has a mechanical strength that is weaker than the non-hinge portion of the instrument panel 16.

In addition, a break portion 54 is formed at the other boundary between the airbag door 50 and the other portion of the instrument panel 16. The portion of the instrument panel 16 formed as the break portion 54 is further thinner than the portion of the instrument panel 16 formed as the hinge portion 52. For this reason, the break portion 54 has a mechanical strength that is even weaker than the hinge portion 52.

As described above, when the bag element 30 is inflated by the pressure of gas supplied from the inflator 40 to press the airbag door 50 from the rear side of the instrument panel 16, a break occurs at the break portion 54 of the instrument panel 16 and then the airbag door 50 rotates about the hinge portion 52. Thus, the instrument panel 16 is opened at the location, at which the airbag door 50 is set, to allow the bag element 30 to deploy toward the compartment of the vehicle 14.

As shown in FIG. 1, the bag element 30 has a bag body 60. The bag body 60 has a side base cloth 62 and a side base cloth 64. The outer surface of the side base cloth 62, when the bag element 30 is deployed, substantially faces one side in the width direction of the vehicle 14. The outer surface of the side base cloth 64, when the bag element 30 is inflated and deployed, substantially faces the opposite side in the width direction of the vehicle 14. An outer peripheral base cloth 66 connects the outer peripheral portion of the side base cloth 62 with the outer peripheral portion of the side base cloth 64 except the portion corresponding to the open end of the bag element 30. Thus, the bag body 60 is formed.

In addition, as shown in FIG. 1 and FIG. 3, the side base cloth 62 has a hole portion 72. A cylindrical tube vent 74 is provided for the side base cloth 62 in correspondence with the hole portion 72. In the present embodiment, the tube vent 74 is open at both ends and, in addition, is formed so as to taper from the proximal end toward the distal end when deployed. The proximal end portion (open end at the proximal end) of the tube vent 74 is connected to the periphery of the hole portion 72, and the tube vent 74 is in fluid communication with the inside of the bag body 60 through the hole portion 72.

Figure 5:
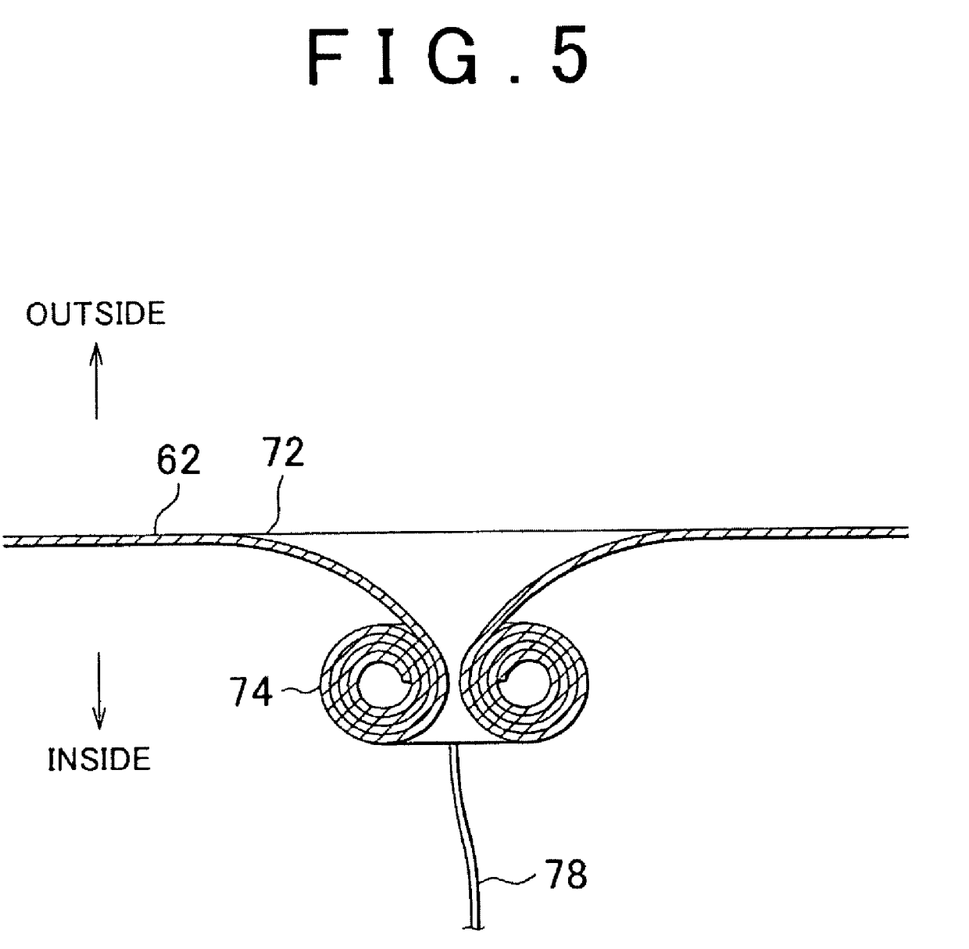
FIG. 5 is an enlarged cross-sectional view that shows a state where the tube vent is rolled up.

The tube vent 74 is located inside the bag body 60 before the bag element 30 inflates and deploys. In addition, the tube vent 74 is rolled up about an axis extending in a direction along the outer periphery of the tube vent 74. As shown in FIG. 5, the tube vent 74 is rolled radially outward, and, in the cross-sectional shape, the distal end portion of the tube vent 74 is located on the outer side of the proximal end portion thereof and is formed in a spiral shape so as to wrap the distal end portion.

Figure 7:
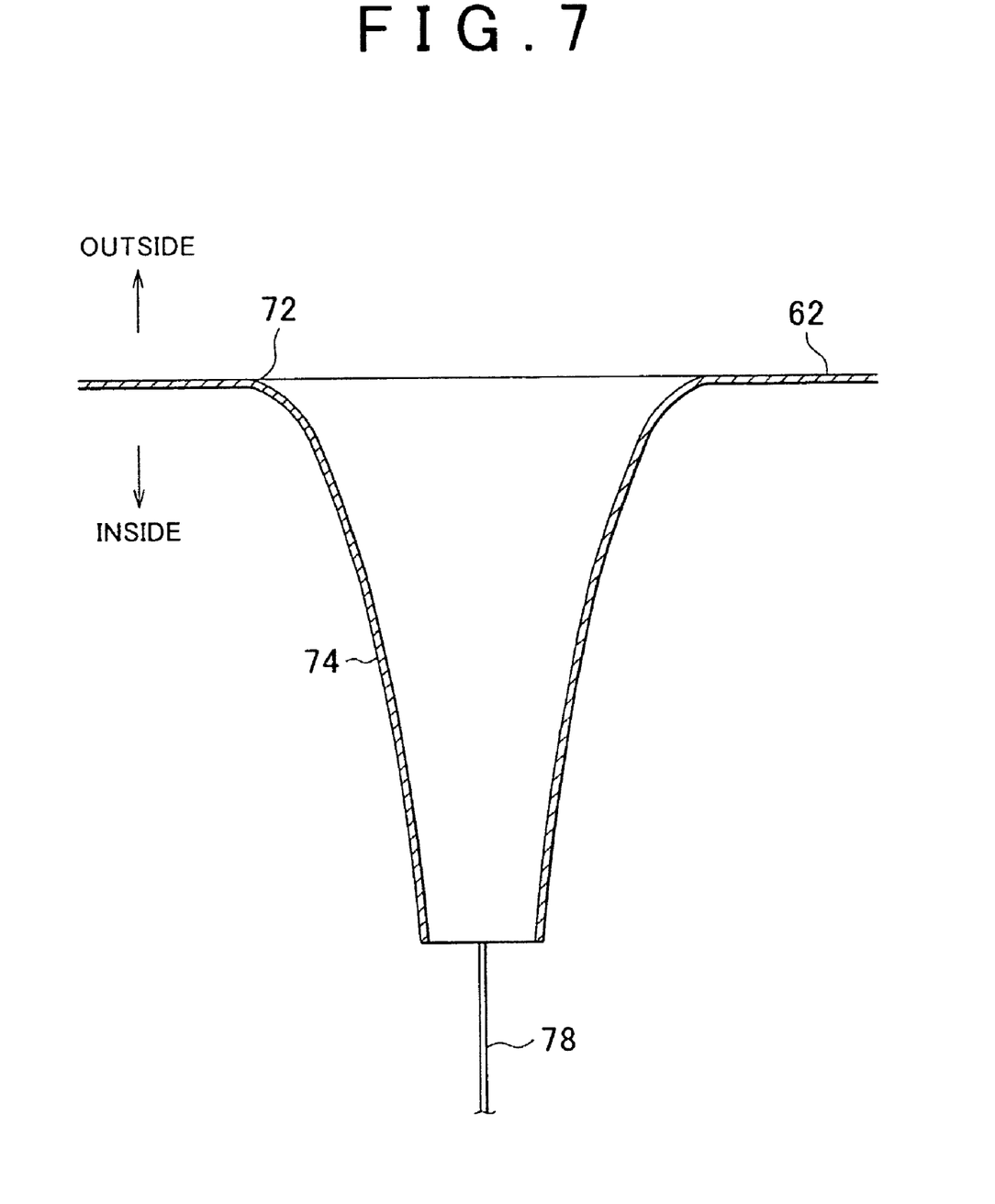
FIG. 7 is an enlarged cross-sectional view that shows the tube vent unrolled and straightened when inside of the bag body.

On the other hand, FIG. 3 and FIG. 7 show the rolled tube vent 74 is completely unrolled. As shown in these drawings, a first end portion of a tether 78 is anchored to the distal end of the tube vent 74 and serves to pull the distal end of the tube vent 74. When the tube vent 74 is rolled up, the tether 78 is also rolled up together with the tube vent 74. A second end portion side of the tether 78 rolled up together with the tube vent 74 extends from a side portion of the tube vent 74 at a location near the proximal end portion through the inner side of the bag body 60, and then passes through a small hole 80, formed in the base plate 12, to the outside of the base plate 12.

In contrast, as shown in FIG. 1 and FIG. 3, the side base cloth 64 has a hole portion 82. A cylindrical tube vent 84 is provided for the side base cloth 64 in correspondence with the hole portion 82. In the present embodiment, the tube vent 84 is open at both ends and, in addition, is formed so as to taper from the proximal end toward the distal end when deployed. The proximal end portion (open end at the proximal end) of the tube vent 84 is connected to the periphery of the hole portion 82, and the tube vent 84 is in fluid communication with the inside of the bag body 60 through the hole portion 82.

The tube vent 84, as well as the tube vent 74, are located inside the bag body 60 before the bag element 30 is inflated. In addition, the tube vent 84, as well as the tube vent 74, are rolled radially outward. Although not shown in the drawing in detail, in the cross-sectional shape, the distal end portion of the tube vent 84 is located on the outer side of the proximal end portion thereof and is formed in a spiral shape so as to wrap the distal end portion.

As shown in FIG. 1, FIG. 3 and FIG. 4, a first end portion of a tether 88, which serves as a pulling member, is anchored to the distal end of the tube vent 84. When the tube vent 84 is rolled up, the tether 88 is also rolled up together with the tube vent 84. A second end portion side of the tether 88 rolled up together with the tube vent 84 extends from a side portion of the tube vent 84 at a location near the proximal end portion through the inner side of the bag body 60, and then passes through the small hole 80, formed in the base plate 12, to the outside of the base plate 12.

Figure 10:
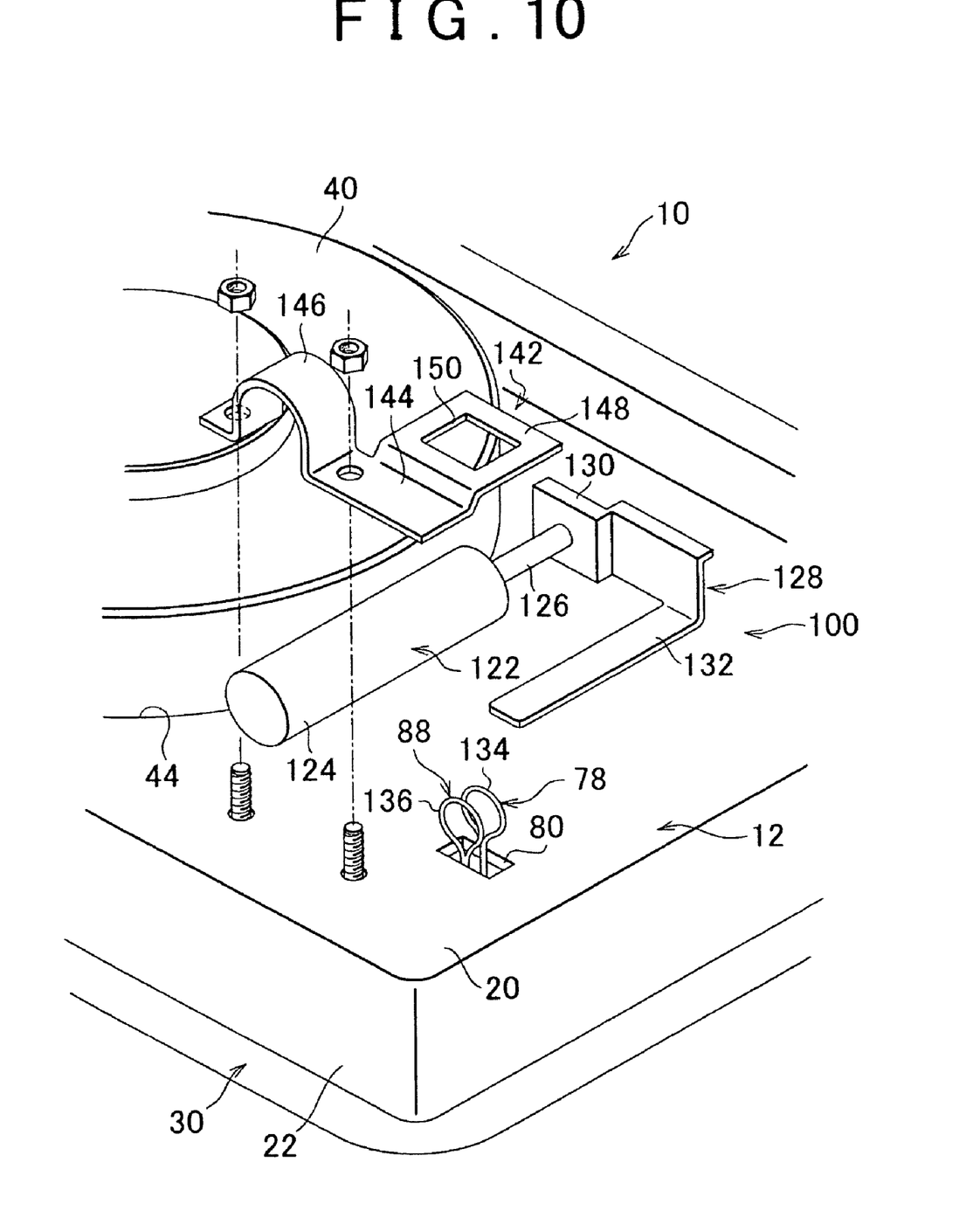
FIG. 10 is an enlarged exploded perspective view of the structure of a retaining portion.

As shown in FIG. 9, a tether retainer 100, which serves as a retaining portion, is provided on the rear side of the base plate 12. As shown in FIG. 10, the tether retainer 100 includes a micro gas generator 122. The micro gas generator 122 has a cylinder 124. The axial direction of the cylinder 124 is parallel to the outer surface of the bottom wall 20. The cylinder 124 accommodates a piston (not shown) so that the piston is slidable in the axial direction of the cylinder 124. The proximal end portion of a rod 126 is integrally connected to one end of the piston in the axial direction of the cylinder 124. The distal end of the rod 126 extends to the outside of the cylinder 124, and a slider 128 is connected to the distal end of the rod 126. The slider 128 has a connecting piece 130.

The connecting piece 130 is formed in a plate shape so that the thickness direction of the connecting piece 130 is oriented in the axial direction of the cylinder 124. The longitudinal direction of the connecting piece 130 is substantially parallel to the outer surface of the bottom wall 20, and the distal end of the rod 126 is integrally connected to one of the surfaces in the thickness direction at the one side of the connecting piece 130 in the longitudinal direction. A retaining piece 132 is formed at one end in the width direction (end portion adjacent to the bottom wall 20) at the other side of the connecting piece 130 in the longitudinal direction. The retaining piece 132 is formed in a plate shape so that the longitudinal direction and width direction of the retaining piece 132 are substantially parallel to the outer surface of the bottom wall 20, and is connected to the connecting piece 130 at its proximal end portion in the longitudinal direction. The orientation of the retaining piece 132 toward the distal end in the longitudinal direction faces in the opposite direction with respect to the orientation of the rod 126 toward the distal end in the longitudinal direction.

The retaining piece 132 passes over the small hole 80 formed in the base plate 12, and is inserted through an annular hooking ring 134 and an annular hooking ring 136. The annular hooking ring 134 is formed at the second end portion side of the tether 78. The annular hooking ring 136 is formed at the second end portion side of the tether 88. In this way, because the retaining piece 132 is inserted through the hooking rings 134 and 136, the second end portion sides of the tethers 78 and 88 are restricted from passing through the small hole 80 toward the inside of the base plate 12.

In addition, the cylinder 124 accommodates a gas generating agent and an ignition device therein (specifically, on a side of the piston, opposite to the side on which the rod 126 is provided, in the cylinder 124). The gas generating agent burns to instantaneously generate gas. The ignition device ignites the gas generating agent when it receives an ignition signal from a control unit, such as an airbag ECU (not shown). The gas generating agent burns to generate gas inside the cylinder 124, and, as the internal pressure in the cylinder 124 increases, the piston in the cylinder 124 slides. As the piston slides, the rod 126 slides and then the slider 128 moves away from the cylinder 124. Thus, when the retaining piece 132 slips off from the hooking rings 134 and 136 as the slider 128 moves, thereby releasing tethers 78 and 88 from the retaining piece 132, and allowing the second end portion sides of the tethers 78 and 88 to pass through the small hole 80.

The tether retainer 100 also includes a fixing member 142. The fixing member 142 has a plate-like base portion 144. A generator retaining piece 146 extends from the base portion 144. The generator retaining piece 146 is curved along the outer peripheral shape of the cylinder 124 so that its opening faces the bottom wall 20, and the cylinder 124 is arranged inside the curved portion. When the fixing member 142 is screwed onto the bottom wall 20, the cylinder 124 is retained by the generator retaining piece 146 and the bottom wall 20.

In addition, a slide guide 148 extends from a location of the base portion 144, facing the distal end portion of the retaining piece 132 in the longitudinal direction of the retaining piece 132. The slide guide 148 is formed at a distance, which is slightly larger than the thickness of the retaining piece 132, from the outer surface of the bottom wall 20 at its distal end, and the retaining piece 132 is placed between the slide guide 148 and the bottom wall 20. The slide guide 148 has a rectangular hole portion 150 in correspondence with the small hole 80. The hooking rings 134 and 136, through which the retaining piece 132 is inserted, have portions located adjacent to the slide guide 148 with respect to the retaining piece 132. Those portions of the hooking rings 134 and 136 are positioned inside the hole portion 150.

Next, the operation and advantages of the present embodiment will be described.

In the airbag device 10, when a vehicle state sensor, such as an acceleration sensor, detects that the vehicle is when the vehicle collides with an object, and then a detected signal output from the vehicle state sensor is input to the control unit, such as the airbag ECU, the control unit activates the ignition device (not shown) provided for the inflator 40. When the ignition device of the inflator 40 is activated, the ignition device causes the gas generating agent inside the inflator 40 to burn. As the gas generating agent burns, a large amount of gas is instantaneously generated.

The gas thus generated in the inflator 40 is discharged from the inflator 40 on the upper side with respect to the bottom wall 20. Because the inflator 40 is provided inside the open end of the bag element 30, the gas discharged from the inflator 40 is fed into the bag element 30. The gas fed into the bag element 30 inflates the bag element 30. The bag element 30 presses the airbag door 50 from the rear side of the instrument panel 16 as it inflates. As the airbag door 50 is pressed by the bag element 30, the instrument panel 16 breaks at the break portion 54, and the airbag door 50 is rotated about the hinge portion 52. Thus, when the rectangular hole is formed in the instrument panel 16, the bag element 30 is deployed through this hole in front of a seat corresponding to the airbag device 10 inside the compartment of the vehicle 14 as shown in FIG. 3.

In this way, in a state where the bag element 30 is deployed in the compartment of the vehicle 14, when an occupant on the seat corresponding to the airbag device 10 is moved toward the front of the vehicle 14, because of inertia, during rapid deceleration of the vehicle, the deployed bag element 30 receives the body of the occupant.

Figure 6:
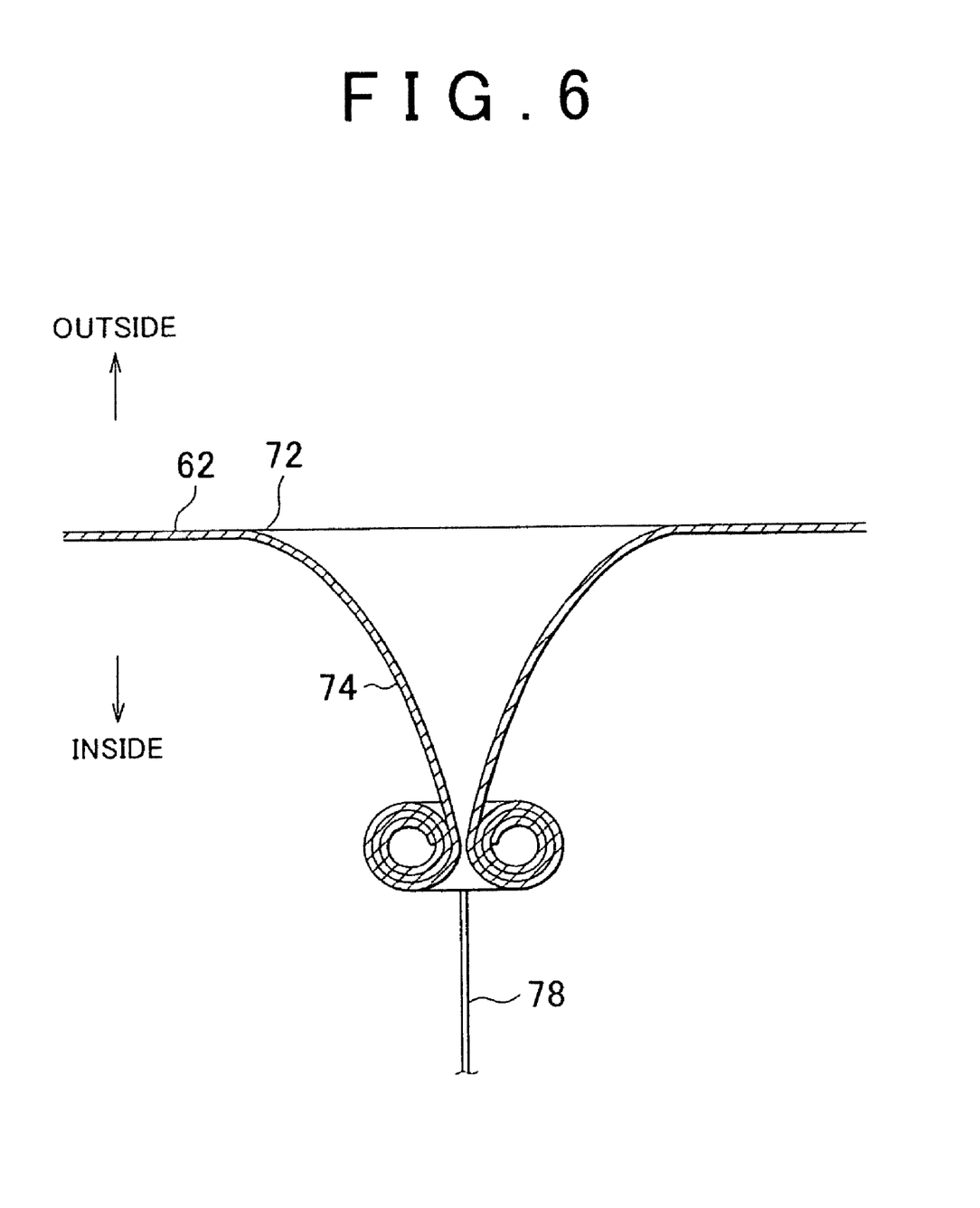
FIG. 6 is an enlarged cross-sectional view that shows the rolled tube vent in process of unrolling.

In addition, as described above, in process of deploying the bag element 30, the hole portions 72 and 82 are separated from the base plate 12. In this way, when the hole portions 72 and 82 are distanced from the base plate 12, the second end portion sides are retained by the retaining piece 132 of the tether retainer 100, and the tethers 78 and 88, of which the first ends are located adjacent to the hole portions 72 and 82, are straightened. As the bag element 30 further inflates so that the hole portions 72 and 82 become separated from the base plate 12, the tethers 78 and 88 are straightened, as shown in FIG. 6, and pull the distal ends of the tube vents 74 and 84 to thereby gradually unroll the tube vents 74 and 84.

Furthermore, as the bag element 30 is deployed in the compartment of the vehicle 14, as shown in FIG. 3, the tube vents 74 and 84 are pulled by the tethers 78 and 88, as shown in FIG. 7, so that the distal ends extend toward the inside of the bag body 60, and then the tube vents 74 and 84 are retained in this state.

Here, for example, if it is determined that the body of the seated occupant is not small based on a signal from an occupant body size sensor, such as a load sensor, provided in the seat, the micro gas generator 122 is not activated. Thus, the retaining piece 132 remains inserted through the hooking ring 134 of the tether 78 and the hooking ring 136 of the tether 88. Hence, the tube vents 74 and 84 are pulled by the tethers 78 and 88 and are retained so that the distal ends extend from the proximal ends toward the inside of the bag body 60.

In this way the tube vents 74 and 84 become completely unrolled; however, because the tube vents 74 and 84 are flattened by the internal pressure in the bag body 60, it is possible to suppress gas leakage from the interior of the bag element 30 through the tube vents 74 and 84. Thus, the internal pressure in the bag element 30 when the bag element 30 is deployed may be maintained so that the deployed bag element 30 may effectively receive the occupant, even if the body of the occupant is large.

On the other hand, for example, if it is determined that the body size of the occupant seated on the seat is small based on a signal from the occupant body size sensor, the inflator 40 is activated as described above to cause the bag body 60 to deploy in the compartment of the vehicle 14, whereby the tube vents 74 and 84 are pulled by the tethers 78 and 88 and then the distal ends are completely straightened from the proximal ends toward the inside of the bag body 60. Synchronously with the complete unrolling of the tube vents 74 and 84, the control unit, such as the airbag ECU, outputs an ignition signal to the ignition device of the micro gas generator 122. When the ignition signal activates the ignition device of the micro gas generator 122, the gas generating agent inside the cylinder 124 burns, thereby generating gas inside the cylinder 124. Thus, as the internal pressure in the cylinder 124 increases, the piston in the cylinder 124 slides.

The rod 126 slides together with the piston to move the slider 128 away from the cylinder 124. This causes the retaining piece 132 to slip off from the hooking rings 134 and 136. When the retaining piece 132 slips off from the hooking rings 134 and 136, the tethers 78 and 88 are released from the retaining piece 132 and, as a result, the tube vents 74 and 84 are released from the retaining piece 132.

Figure 8:
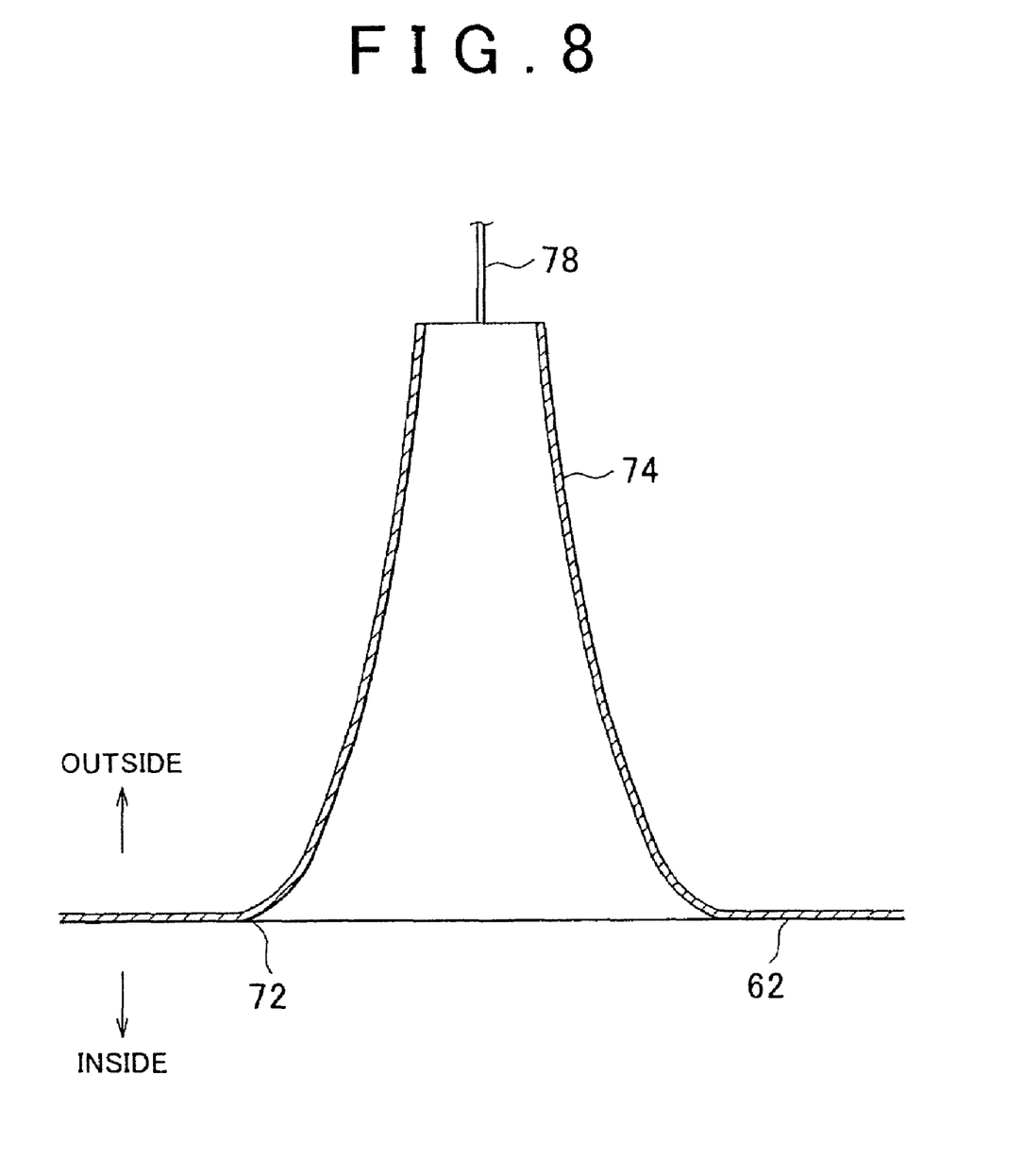
FIG. 8 is an enlarged cross-sectional view that shows the tube vent extending to the outside of the bag body.

Once the tube vents 74 and 84 are released from the retaining piece 132, the proximal ends of the tube vents 74 and 84 come out of the hole portions 72 and 82 to the outside of the bag body 60 by the internal pressure in the bag body 60 to be reversed inside out. The tube vents 74 and 84 are gradually reversed inside out from their proximal ends and then, as shown in FIG. 4 and FIG. 8, the tube vents 74 and 84 are extended to the outside of the bag body 60, the gas inside the bag element 30 flows through the hole portions 72 and 82 into the tube vents 74 and 84. Then, the pressure of the gas inflates the tube vents 74 and 84, which causes the distal end portions of the tube vents 74 and 84 to open. Thus, the inside and outside of the bag body 60 are in fluid communication with each other through the tube vents 74 and 84, and the gas inside the bag element 30 is discharged to the outside of the bag element 30. In this way, the internal pressure in the bag element 30 is reduced by discharging the gas inside the bag element 30, so the tension of the bag element 30 is weak when the bag element 30 receives a relatively small occupant.

Here, in the airbag device 10, the tube vents 74 and 84 are respectively rolled about the axes extending in the directions along the outer peripheries of the tube vents 74 and 84. As the distal ends of the tube vents 74 and 84 are rolled up on the outer sides of the proximal ends of the tube vents 74 and 84, the portions of the tube vents 74 and 84 at the distal ends press the portions of the tube vents 74 and 84 at the proximal ends to reduce the sizes of the tube vents 74 and 84 radially inward (that is, in a direction that is substantially perpendicular to the longitudinal directions of the tube vents 74 and 84 and in a direction to reduce the diameters of the tube vents 74 and 84).

Thus, the opening sizes of the proximal ends of the tube vents 74 and 84, located on the radially inner sides of the distal ends of the tube vents 74 and 84, gradually decrease as the tube vents 74 and 84 are rolled up as described above. Ultimately, the proximal end portions of the tube vents 74 and 84 are essentially closed or the openings of the proximal end portions of the tube vents 74 and 84 are considerably reduced (FIG. 5 shows openings of the distal end portions of the tube vents 74 and 84 that are significantly reduced if not completely closed).

This minimizes leakage of gas from the bag element 30 when the bag element 30 is deployed, particularly during the initial stage of inflation of the bag element 30. Particularly, during a period from the tube vents 74 and 84 rolled up as shown in FIG. 5 until the tube vents 74 and 84 are completely straightened as they are pulled by the tethers 78 and 88 as shown in FIG. 7, leakage of gas from the bag element 30 is minimized. Thus, even if the performance of the inflator 40 is not improved, such as increasing the size of the inflator 40, the bag element 30 may be efficiently and quickly deployed.

In addition, when the bag element 30 is deployed, the second ends of the tube vents 74 and 84 are pulled by the tethers 78 and 88, which are retained by the retaining piece 132 of the tether retainer 100, and, as a result, the tube vents 74 and 84 are unrolled. In this way, by the time when the tethers 78 and 88, that is, the tube vents 74 and 84, are released from the retaining piece 132 of the tether retainer 100, the tube vents 74 and 84 are completely unrolled and straightened.

Thus, when the tube vents 74 and 84 are released from the retaining piece 132 of the tether retainer 100, no portion of the distal ends of the tube vents 74 and 84 remain rolled. In this manner, the tube vents 74 and 84, which are straightened toward the inside of the bag element 30, are smoothly reversed inside out from the proximal ends while coming off from the hole portions 72 and 82 to extend to the outside of the bag element 30. Thus, it is possible to smoothly and quickly reduce (adjust) the internal pressure in the bag element 30 by discharging the gas inside the bag element 30.

Furthermore, for example, if the tube vents 74 and 84 were rolled radially inward so that the distal end portions are located on the inner sides of the proximal end portions, the distal ends of the tube vents 74 and 84 are crammed to the inner sides of the proximal ends of the tube vents 74 and 84 to thereby close the proximal end portions of the tube vents 74 and 84. Thus, when the tube vents 74 and 84 are thus rolled radially inward as well, a similar operation as described above may be obtained, and similar advantages as described above may be obtained.

However, in the airbag device 10, the tube vents 74 and 84 are rolled radially outward as described above. It is easier to roll the tube vents radially outward than radially inward. Thus, the tube vents 74 and 84 may be rolled up more efficiently. In addition, rolling the tube vents 74 and 84 radially-outward makes it easier to unroll them than in comparison with rolling the tube vents 74 and 84 radially inward. Thus, the tube vents 74 and 84 may be easily and smoothly unrolled by pulling the tethers 78 and 88, so that the tube vents 74 and 84 contribute to smooth and quick reduction (adjustment) of the internal pressure in the bag element 30.

In the present embodiment, the side base cloth 62 has the hole portion 72 at which the tube vent 74 is provided, and the side base cloth 64 has the hole portion 82 at which the tube vent 84 is provided. However, the configuration may be such that the hole portion and the tube vent are provided only one of the side base cloths. That is, it is also applicable that the side base cloth 62 has the hole portion 72 at which the tube vent 74 is provided, and the hole portion 82 and the tube vent 84 may be omitted from the side base cloth 64. Furthermore, it is also applicable that the side base cloth 64 has the hole portion 82 at which the tube vent 84 is provided, and neither the hole portion 72 nor the tube vent 74 is provided in the side base cloth 62.

In addition, in the present embodiment, the retaining piece 132 is inserted through the hooking rings 134 and 136 of the tethers 78 and 88 to retain the proximal ends of the tethers 78 and 88, and the retaining piece 132 slips off from the hooking rings 134 and 136 to release the tethers 78 and 88 from the retaining piece 132. However, the configuration of the retainment and releasing of the tethers 78 and 88 is not limited to the above configuration. For example, it is also applicable that the proximal ends of the tethers 78 and 88 are retained by the slide guide 148, and the tethers 78 and 88 may be cut by a cutter that slides as the micro gas generator 122 is activated to thereby release the tethers 78 and 88 from the slide guide 148.

What is claimed is:

1. An airbag device comprising:
a bag element that includes
a bag body that is inflated and deployed using gas supplied to an interior of the bag body, which increases an internal pressure in the bag body, and that has a hole portion through which gas is discharged to an outside of the bag body; and
a tube vent that is formed in a cylindrical shape open at both ends, wherein a proximal end of the tube vent is connected to the bag body along the hole portion and is rolled up from a distal end of the tube vent toward a proximal end of the tube vent, and wherein, the tube vent is unrolled as the bag body inflates and deploys, and the tube vent discharges the gas from the interior the bag body to the outside of the bag body when the distal end extends outside of the bag body.

2. The airbag device according to claim 1, further comprising:
a pulling member that has a first end and a second end, wherein the first end is anchored to the distal end of the tube vent, and wherein the pulling member is rolled up together with the tube vent; and
a retaining portion that retains the second end of the pulling member, wherein the retaining portion causes the tube vent to unroll in such a manner that the first end of the pulling member is separated from the second end as the bag body inflates and deploys, which generates tension in the pulling member and then retains the tube vent so that the distal end of the tube vent is straightened toward the inside of the bag body, and wherein the tube vent extends toward the outside of the bag body when the retaining portion releases the second end of the pulling member.

3. The airbag device according to claim 2, wherein the retaining portion releases the second end of the pulling member after the distal end of the tube vent is straightened toward the interior of the bag body.

4. The airbag device according to claim 2, further comprising:
an inflator that supplies gas to the interior of the bag body, wherein after the inflator is activated, the retaining portion is driven to release the second end of the pulling member.

5. The airbag device according to claim 1, wherein the tube vent is rolled radially outward so that a distal end of the tube vent is located on an outer side of the proximal end of the tube vent.

6. The airbag apparatus according to claim 1, wherein:
the airbag includes a first side base cloth positioned in one side of the airbag in a width direction of a vehicle when the airbag is in an inflated and deployed state, a second side base cloth positioned in the other side of the airbag in the width direction of the vehicle when the airbag is in the inflated and deployed state, and an outer peripheral base cloth that connects an outer periphery of the first side base cloth to an outer periphery of the second side base cloth; and
the first hole, the second hole, and the tube vent are provided in at least one of the first side base cloth and the second base cloth.

7. An airbag device comprising:
a bag element that includes
a bag body that is inflated and deployed using gas supplied to an interior of the bag body, and that has a hole portion through which gas is discharged to an outside of the bag body; and
a tube vent that is formed in a cylindrical shape open at both ends, wherein
a proximal end of the tube vent is connected to the bag body along the hole portion and is folded from a distal end of the tube vent toward a proximal end of the tube vent,
the tube vent is unfolded as the bag body inflates and deploys, and the tube vent discharges the gas from the interior of the bag body to the outside of the bag body when the distal end extends outside of the bag body, and
a folded portion of the distal end of the tube vent presses a portion of the folded tube vent located on a radially inward side of the folded portion of the tube vent and located near the proximal end, thereby reducing the diameter of the folded tube where the folded portion of the distal end presses on the folded tube vent.

8. The airbag device according to claim 7, further comprising:
a pulling member that has a first end and a second end, wherein the first end is anchored to the distal end of the tube vent, and wherein the pulling member is folded together with the tube vent; and
a retaining portion that retains the second end of the pulling member, wherein the retaining portion causes the tube vent to unfold in such a manner that the first end of the pulling member is separated from the second end as the bag body inflates and deploys, which generates tension in the pulling member and then retains the tube vent so that the distal end of the tube vent is straightened toward the inside of the bag body, and wherein the tube vent extends toward the outside of the bag body when the retaining portion releases the second end of the pulling member.

9. The airbag device according to claim 3, wherein the retaining portion releases the second end of the pulling member after the distal end of the tube vent is straightened toward the interior of the bag body.

10. The airbag device according to claim 8, further comprising:
an inflator that supplies gas to the interior of the bag body, wherein after the inflator is activated, the retaining portion is driven to release the second end of the pulling member.

11. The airbag device according to claim 7, wherein
the tube vent is folded outward so that a distal end of the tube vent is located on an outer side of the proximal end of the tube vent.

12. The airbag apparatus according to claim 7, wherein:
the airbag includes a first side base cloth positioned in one side of the airbag in a width direction of a vehicle when the airbag is in an inflated and deployed state, a second side base cloth positioned in the other side of the airbag in the width direction of the vehicle when the airbag is in the inflated and deployed state, and an outer peripheral base cloth that connects an outer periphery of the first side base cloth to an outer periphery of the second side base cloth; and
the first hole, the second hole, and the tube vent are provided in at least one of the first side base cloth and the second base cloth.

13. A bag element for an airbag device, comprising:
a bag body that is inflated and deployed using gas supplied to an interior of the bag body, and that has a hole portion through which gas is discharged to an outside of the bag body; and
a tube vent that is formed in a cylindrical shape open at both ends, wherein a proximal end of the tube vent is connected to the bag body along the hole portion and is rolled up from a distal end of the tube vent toward a proximal end of the tube vent, and wherein, the tube vent is unrolled as the bag body inflates and deploys, and the tube vent discharges the gas from the interior of the bag body to the outside of the bag body when the distal end extends outside of the bag body.

14. The bag element for the airbag device according to claim 13, further comprising:
a pulling member that has a end, wherein the end is anchored to the distal end of the tube vent, and wherein the pulling member is rolled up together with the tube vent.

15. The bag element for the airbag device according to claim 13, wherein
the tube vent is rolled radially outward so that a distal end of the tube vent is located on an outer side of the proximal end of the tube vent.

16. The airbag apparatus according to claim 1, wherein:
the airbag includes a first side base cloth positioned in one side of the airbag in a width direction of a vehicle when the airbag is in an inflated and deployed state, a second side base cloth positioned in the other side of the airbag in the width direction of the vehicle when the airbag is in the inflated and deployed state, and an outer peripheral base cloth that connects an outer periphery of the first side base cloth to an outer periphery of the second side base cloth; and
the first hole, the second hole, and the tube vent are provided in at least one of the first side base cloth and the second base cloth.

* * * * *